Aug. 26, 1952     L. N. BRUTUS     2,607,956
METHOD OF MAKING THREADED LOCKING DEVICES
Original Filed June 27, 1947
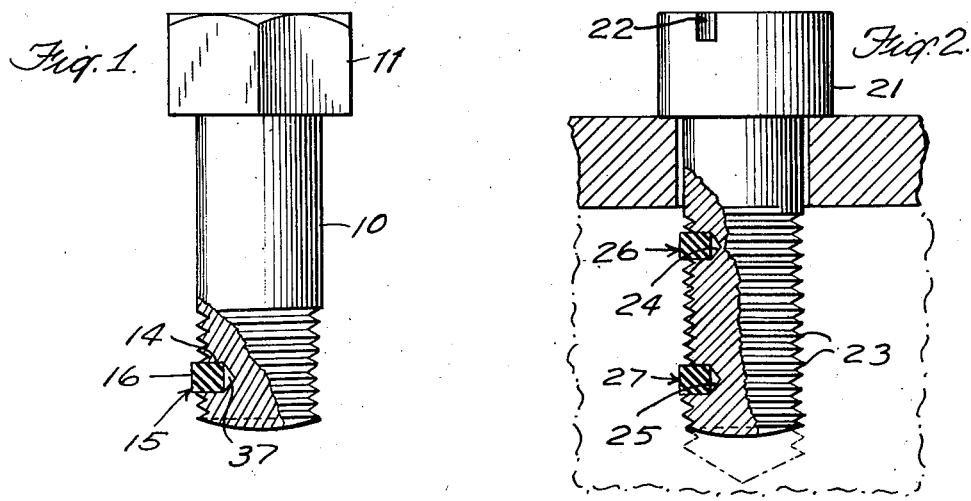
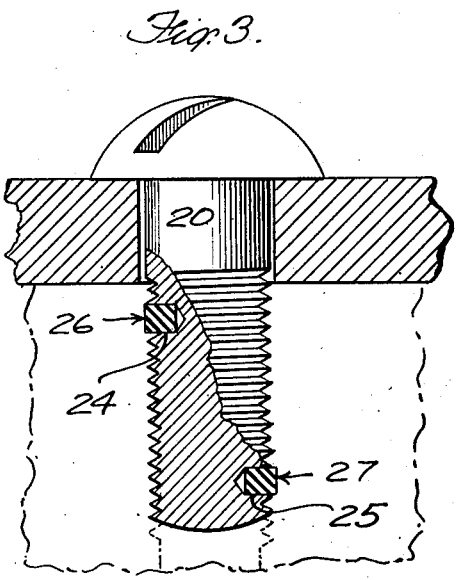
Inventor
LEE N. BRUTUS
Attorney Patented Aug. 26, 1952

2,607,956

UNITED STATES PATENT OFFICE 2,607,956

METHOD OF MAKING THREADED LOCKING DEVICES

Lee N. Brutus, Eaton, Ohio

Original application June 27, 1947, Serial No. 757,563. Divided and this application March 15, 1950, Serial No. 149,862

5 Claims. (Cl. 18—59)

This invention relates to elements having machine screw threads thereon such as machine screws, bolts, studs, threaded rods, nuts, or the like, and has for an object to provide novel and improved lock means to prevent the elements from turning.

Another object is to provide an improved method of securing a locking device of the type above indicated in the threaded element.

Various other objects and advantages will be apparent as the nature of the invention is more fully disclosed.

This application is a division of my co-pending application Serial No. 757,563 filed June 27, 1947, for Lock Screw or The Like, now Patent No. 2,520,121.

Although the novel features which are characteristic of this invention are pointed out more particularly in the claims, the nature of the invention will be better understood by referring to the following description, taken in connection with the accompanying drawing, in which a specific embodiment thereof has been set forth for purposes of illustration.

In the drawing:

Fig. 1 is a side elevation, partly in section, of a bolt showing my improved locking device;

Fig. 2 is a similar side elevation, partly in section, of a machine screw showing a modified form of locking device; and Fig. 3 is a sectional view similar to Fig. 2 showing a further modified form of locking device.

In accordance with the present invention, I provide a small plug of a material which is capable of being deformed without taking a permanent set and which tends to return to its original shape gradually as distinguished from rubber-like compositions which return to their original shape as soon as the deforming pressure is removed. This plug is inserted in one side of the threaded shank in a position to bear against the internal thread of the external member. The plug has the characteristic of locking the shank against turning due to the friction produced by the plug itself against the internal threads and also by the lateral displacement of the shank in the external thread due to the pressure exerted by the plug on one side of the threaded shank.

I have found that nylon is particularly suited for this purpose. Nylon has the property of tending to return to its original shape after being deformed. Hence it does not take a permanent set and may be repeatedly reused. The external thread is pressed rather than cut into the surface of the nylon plug by the engaged thread and the tendency of the nylon plug to return to its original shape maintains a pressure against the engaged thread which produces a permanent locking effect. Such a locking device is effective after many repeated uses inasmuch as the surface of the plug returns to its original shape after each use.

Referring to the drawings more in detail, the invention is shown in Fig. 1 as applied to a bolt comprising a shank 10 and a head 11. The shank 10 is threaded throughout at least a portion of its length with a machine screw thread 12 which is adapted to enter a tapped hole in a machine part or to receive a nut.

At one side, near the end of the threaded portion of the shank 10, a small recess 14 is drilled through the thread 12 into the shank. The recess 14 preferably terminates short of the axis of the shank so as to remove as small an amount of metal as possible. Within this recess a plug 15 of nylon, or the like, is secured. The plug 15 has a smooth outer surface 16 which is preferably flush with the top of the thread 12 or may extend slightly beyond the top of said thread, but in any event lies above the bottom of the thread so as to be deformed when secured into the outer member.

In Fig. 2 the invention is shown as applied to a machine screw comprising a shank 20 having a head 21 provided with a slot 22 to receive a screw driver, or the like. The head may, however, be of any type or the shank may be threaded at both ends as in a stud in the form shown. The shank 20 is threaded throughout a substantial portion of its length by a machine screw thread 23. In this embodiment a plurality of recesses 24 and 25 are drilled through the threads 23 on one side of the shank 20 near the upper and lower limits of the thread respectively. These recesses 24 and 25 carry plugs 26 and 27 respectively of nylon, or the like, similar to the plug 16 above referred to.

The embodiment shown in Fig. 3 is generally similar to that shown in Fig. 2 except that in Fig. 3 the recesses 24 and 25 are formed on opposite sides of the shank 20 instead of the same side as in Fig. 2.

In any of these embodiments means must be provided for securing the plugs of nylon, or the like, in the recesses in the shank. One means for securing the nylon plug in the shank utilizes the tendency of the nylon to return gradually to its original shape. The nylon may be obtained in the form of a rod which is cast in a size to fit tightly in the recess in the threaded shank, or may be of a diameter which is slightly oversize with respect to the shank recess. To facilitate insertion of the plug in the recess, the end of the nylon rod may be temporarily reduced in diameter by suitable means as by applying external compression, by extrusion through a reducing die having a tapered hole, or by rolling the end of the rod between pressure plates. Due to the gradual return of the material, the reduced end of the rod may be inserted in the shank recess and cut at the level of the thread to form the plug insert as shown in Figs. 1 to 3 before the stock has had time to expand. After expansion, however, the plug becomes firmly secured to the shank. The rod may be precut to form separate plugs which are reduced and inserted in the above manner.

The plug is preferably formed so that its inner end terminates short of the bottom end of the recess 14, 24 or 25 so as to leave an expansion space 37.

When this shank is placed in an internally threaded member the internal thread of the external member compresses the top surface of the plug to cause the same to conform to the shape of the threads and in so doing displaces the inner end of the plug into the expansion space 37. The air pressure thus built up in the space 37, the resilience of the plug, and the natural tendency of the plug to return to its initial shape causes the plug to exert a substantial pressure upon the threads of the external member which pressure is maintained throughout the period of use of the element.

In the embodiment shown in Fig. 1, the shank 10 is secured to the outer nut or other threaded element by lateral displacement between the internal and external threads produced by the pressure of the plug 15, and also by angular displacement of the axis of the shank. In Fig. 2 a lateral displacement of the entire shank 20 is produced which increases the friction of the mating threads on the side of the shank opposite the plugs 26 and 27.

The operation of the form of Fig. 3 is similar to that of Fig. 2 except that the lateral displacement produced by the plugs 26 and 27 in Fig. 3 causes the axis of the shank 20 to tilt with respect to the axis of the tapped hole. This same effect would also be produced by the use of a single plug 27 at the lower end of the shank.

It is obvious that the invention applies to any member having an externally threaded shank which is adapted to engage a corresponding internal thread of a mating member and that the terms used herein are to be interpreted accordingly.

Although specific embodiments of the invention have been shown and described for purposes of illustration, it is to be understood that the invention is capable of various uses and that changes and modifications may be made therein as will be readily apparent to a person skilled in the art.

What is claimed is:

1. The method of inserting and securing in a recess in a metal member, a plug of cold workable synthetic plastic material having the property when cold of returning gradually to its original shape after being deformed in the cold state, which comprises forming a plug having an external diameter in excess of that of said recess, temporarily reducing the diameter of said plug while cold to fit in said recess by applying external compression thereto, removing said external compression, then inserting the plug in said recess in the absence of external compression and while thus reduced, and maintaining the plug cold while expanding due to said property into a locking fit in said recess.

2. The method set forth in claim 1 in which said external compression is effected by extrusion through a reducing die.

3. The method set forth in claim 1 in which said external compression is effected by rolling the plug between a pair of surfaces.

4. The method of inserting and securing in a recess in a metal member a plug of cold workable synthetic plastic material having the property when cold of returning gradually to its original shape after being deformed in the cold state, which comprises forming a rod having an external diameter in excess of that of said recess, temporarily reducing the diameter of the end of said rod while cold to fit in said recess by applying external compression thereto, removing said external compression, then inserting said reduced end in said recess in the absence of external compression and while thus reduced, cutting the rod to leave a plug in said recess, and maintaining the plug cold while expanding due to said property into a locking fit in said recess.

5. The method of inserting and securing in a recess in a metal member a plug of nylon which comprises forming a nylon plug having an external diameter in excess of that of said recess, temporarily reducing the diameter of said plug while cold to fit in said recess by applying external compression thereto, inserting the plug in the recess while thus reduced and maintaining the plug cold while it expands into a locking fit in said recess.

LEE N. BRUTUS.

REFERENCES CITED

The following references are of record in the file of this patent:

UNITED STATES PATENTS

| Number | Name | Date |
|---|---|---|
| 1,329,524 | Hill | Feb. 3, 1920 |
| 1,733,610 | Leipert | Oct. 29, 1929 |
| 2,244,208 | Miles | June 3, 1941 |
| 2,252,504 | Hahn | Aug. 12, 1941 |
| 2,219,873 | Brubaker | Aug. 4, 1942 |
| 2,392,842 | Doell | Jan. 15, 1946 |

FOREIGN PATENTS

| Number | Country | Date |
|---|---|---|
| 468,762 | Great Britain | July 12, 1937 |